United States Patent

[11] 3,625,345

| [72] | Inventors | Lucas J. Conrad;<br>Gerard Eugene Leonard, both of Winston-Salem, N.C. |
|---|---|---|
| [21] | Appl. No. | 20,564 |
| [22] | Filed | Mar. 18, 1970 |
| [45] | Patented | Dec. 7, 1971 |
| [73] | Assignee | R. J. Reynolds Company<br>Winston-Salem, N.C. |

[54] FEED CONVEYER FOR MEAT AND BONES SEPARATOR
9 Claims, 8 Drawing Figs.

[52] U.S. Cl. .................................................. 198/204,
198/233, 417/320
[51] Int. Cl. ..................................................... B65g 15/60
[50] Field of Search ........................................... 198/129,
204, 233; 417/320

[56] References Cited
UNITED STATES PATENTS

| 1,825,572 | 9/1931 | Boger | 198/204 |
| 2,038,471 | 4/1936 | Benatar | 198/204 |

Primary Examiner—Evon C. Blunk
Assistant Examiner—H. S. Lane
Attorneys—Lester W. Clark, Robert S. Dunham, P. E. Henninger, Thomas F. Moran, Gerald W. Griffin, R. Bradlee Boal, Christopher C. Dunham and Robert Scobey ABSTRACT: The feed conveyor consists of an upper trough defining a conveying reach and a lower trough defining a return reach. The conveyor belt is a simple single strand plastic belt of circular cross section on which spaced pushers are mounted by an arrangement which permits ready removal and cleaning of the pushers and belt.

PATENTED DEC 7 1971

INVENTORS
LUCAS J. CONRAD
BY GERARD E. LEONARD

Lester W Clark
ATTORNEY

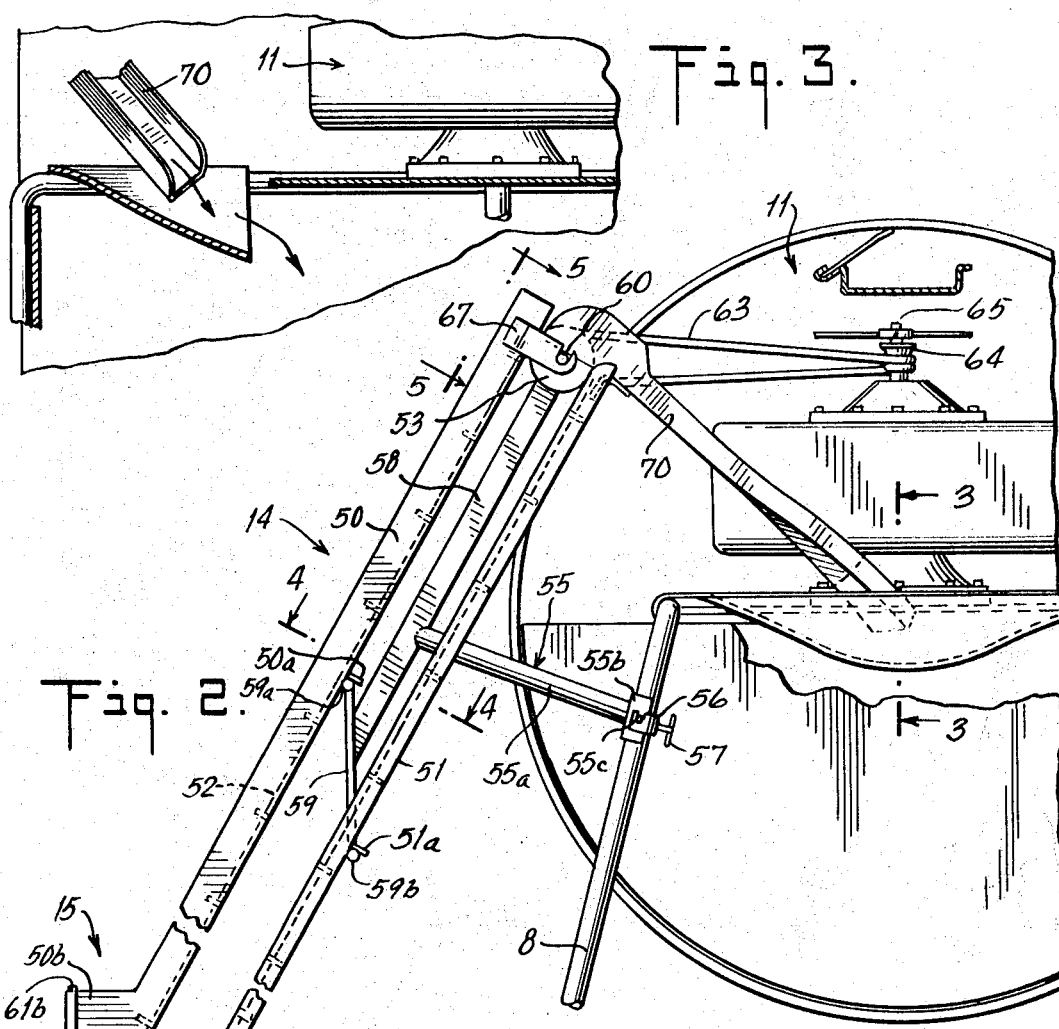
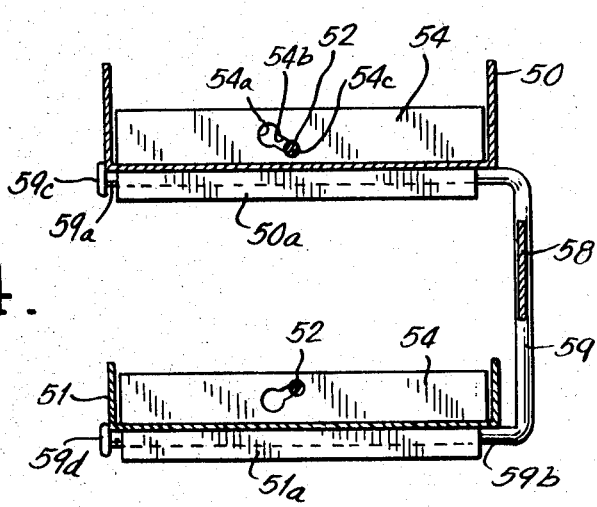

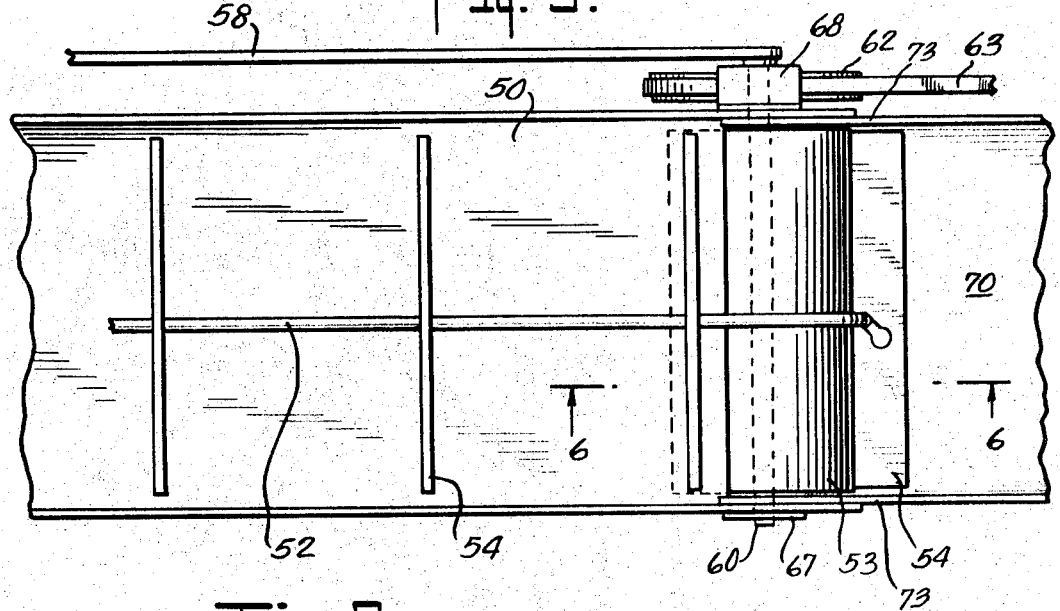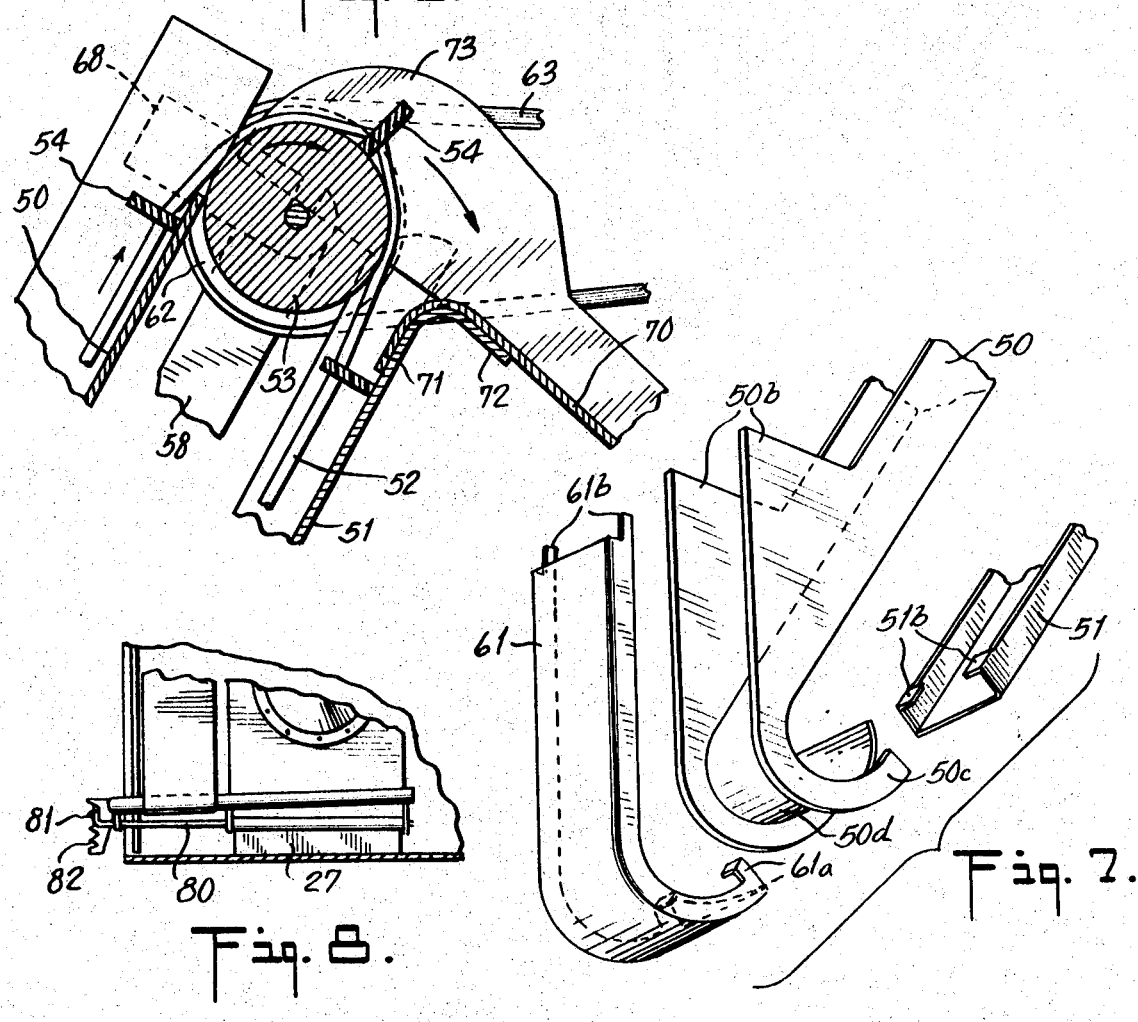

FEED CONVEYER FOR MEAT AND BONES SEPARATOR

CROSS-REFERENCES

The disuniter shown in this application is an improvement on the disuniters shown in Conrad application, Ser. No. 603,484, filed Dec. 21, 1966, now U.S. Pat. No. 3,472,300, issued Oct. 14, 1969. Certain other features of the disuniter are shown and claimed in the applications of Conrad and Alldred, Ser. No. 679,326, filed Oct. 21, 1967, now U.S. Pat. No. 3,514,808 issued June 2, 1970, and Ser. No. 759,709, filed Sept. 13, 1968 now U.S. Pat. No. 3,559,706 issued Feb. 2, 1971.

The separator drum of this application is an improvement on those shown in the application of Alldred and Conrad, Ser. No. 824,381, filed May 8, 1969 now U.S. Pat. No. 3,507,387 issued Apr. 21, 1970 and in Conrad and Everhart, Ser. No. 761,179, filed Sept. 20, 1968,now U.S. Pat. No. 3,508,646 issued Apr. 28, 1970. Another feature of the separator mechanism is shown in Conrad, Ser. No. 754,233, filed Sept. 22, 1969 now U.S. Pat. No. 3,508,645, issued Apr. 28, 1970.

The friction conveyor which catches the meat pieces in the separator and discharges them therefrom is shown in Conrad et al. al. Ser. No. 761,029, filed Sept. 20, 1968, now U.S. Pat. No. 3,547,264, issued Dec. 15, 1970.

The bone elevator mechanism at the discharge end of the separator drum is shown and claimed in Conrad and Pope, Ser. No. 9,513, filed Feb. 9, 1970.

The rotating inspection table illustrated as receiving the meat and bones discharged from the separator drum is shown and claimed in Conrad, Ser. No. 24,710, filed Mar. 1, 1970.

BRIEF SUMMARY

The present invention is concerned with the truck-mounted disuniter unit and the other pieces of apparatus cooperating with that unit and located at the receiving end of the separator drum. The disuniter is supported in a cantilever fashion on the truck so that it may be moved into and out of the end of the separator drum. A closure plate fixed on the truck closes the bottom half of the open end of the drum when the disuniter is in its operating position. A scraper is mounted on the disuniter and is adjustable between a retracted position which is used when the disuniter is being moved in or out of the drum and an operating position where the scraper engages the inside of the drum and prevents food pieces from being carried up and over the disuniter by the rotation of the drum.

The conveyor is mounted on the frame of the truck supporting the disuniter by means of a bracket. It consists of four principal parts defining the conveying reach, the return reach, a feeding hopper and a discharge chute. The conveyor belt consists of a single strand plastic belt of circular cross section on which are fixed at spaced intervals plastic plates which conform generally to the inside contours of the trough defining the conveying reach and the return reach.

BRIEF DESCRIPTION OF THE DRAWINGS

FIG. 2 is an elevational view of the feed conveyor in FIG. 1, on a larger scale, showing its relation to the operating parts of the disuniter unit and the supporting truck.

FIG. 3 is a sectional view taken along the line 3—3 of FIG. 2.

FIG. 4 is a sectional view taken on the line 4—4 of FIG. 2.

FIG. 5 is a view taken on the line 5—5 of FIG. 2.

FIG. 6 is a view taken on the line 6—6 of FIG. 5.

FIG. 7 is an exploded fragmentary perspective view showing the details of the hopper at the lower end of the conveyor.

FIG. 8 is a fragmentary plan view showing the scraper for keeping meat pieces and bones from being carried over the disuniter by the separator.

DETAILED DESCRIPTION

FIG. 1

Figure 1:
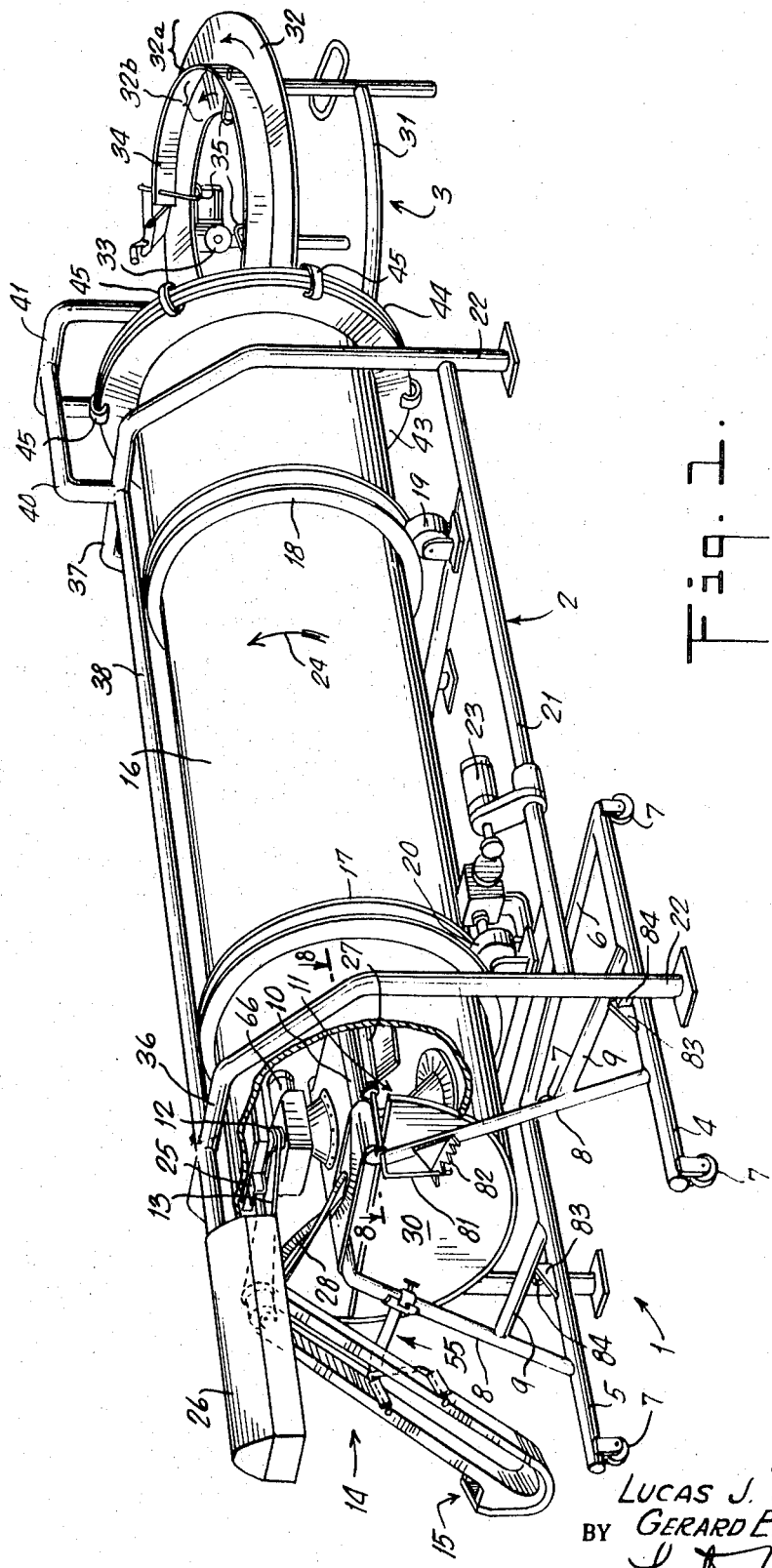
FIG. 1 is an overall perspective view of a complete apparatus for separating meat and bones, including a truck unit carrying a feed conveyor and a disuniter and constructed in accordance with the invention.

The apparatus shown in this figure includes three principal units, namely the truck mounted disuniter apparatus 1, a separator apparatus 2 mounted on a fixed frame and an inspection table 3.

The disuniter apparatus 1 is mounted on a truck including two side frame members 4 and 5 and a cross frame member 6, all supported on four wheels 7. A pair of diagonal frame members 8 extend upwardly and inwardly from the side frame members 4 and 5. The frame members 8 are braced by struts 9. At their upper ends, the diagonal frame members 8 carry horizontally projecting cantilever beams 10 which together support a disuniter apparatus generally indicated at 11. The disuniter 11 rotates on a vertical shaft 12 connected by a belt 13 to a feed conveyor 14 having at its lower end a hopper 15 into which are fed food pieces to be disunited. Typically, these may be cooked chicken pieces with the meat still clinging to the bones. The apparatus, however, is suitable for use with other types of composite food pieces. These food pieces are discharged from the conveyor 14 through a chute 28 into the top of the disuniter 11. The disuniter separates the meat from the bones and discharges a mixture of bones and meat pieces into the bottom of a drum 16 which is the principal element of the separator apparatus 2.

The drum 16 has on its periphery a pair of grooved collars 17 and 18, which rest on rollers 19 and 20 mounted on a frame 21 having four legs 22 which may be attached to an underlying supporting surface. The roller 20 is driven by a motor 23, effective to rotate the drum 16 in the direction indicated by the arrow 24.

The inside surface of the drum 16 is smooth. The meat pieces tend to cling or stick to this smooth surface, while the bones do not cling. Hence the meat pieces are carried upwardly by the drum as it rotates. As they reach the top of the drum, they fall by gravity or are scraped away from the drum surface so as to fall on a longitudinally extending reciprocating friction conveyor 25 actuated by a reciprocating motor 26 mounted on the frame of the separator 2.

In order to prevent meat pieces from riding up to the top of the drum at the locality of the disuniter 11, there is provided a scraper 27 mounted on the frame of the disuniter truck and extending into the drum 16 a sufficient distance so that none of the meat pieces travel more than halfway up the drum until they get beyond the disuniter.

The disuniter truck also caries a shield plate 30 which closes substantially the entire lower half of the open upper end of the drum 16, to prevent pieces of meat and bones from falling out that end of the drum.

The inspection table 3 comprises a frame 31 supporting an annular rotating table 32 driven by a motor 33. A divider 34 supported by brackets 35 mounted on the frame 31 extends around the middle of the annular table 32 for most of its periphery, dividing it into inner and outer sections.

The framework of the separator apparatus 2 includes an inverted U-shaped frame 36 at the left-hand end, as it appears in FIG. 1. A similar U-shaped frame 37 is located at the right-hand end. The central portions of the two U-shaped frames are connected by a longitudinal beam 38. A cantilever beam 40 extends to the right from the U-shaped frame 37 and supports a hanger frame 41 which carries the discharge end (not shown) of the vibrating conveyor 25.

Attached to the end of the drum 16, at its lowest point, is the narrow end of a first tapered ring 43. The attachment of the tapered ring 43 to the drum 16 may be by welding. Another tapered ring 44, opposite in form to the ring 43, is supported on ring 43 by a plurality of ring segments 45, each welded at its opposite ends to the rings 43 and 44. Rings 43 and 44 define between them a V-shaped valley into which the bones fall as they move out of the lower end of the rotating drum 16. The bones become wedged between the rings 43 and 44 and are carried upwardly typically at least a quarter turn of the drum 16, as it rotates. Bones falling from the valley drop onto a chute which carries them to the outer annulus 32a of the rotating table 32. The right-hand end of the vibrating conveyor 25, as viewed in FIGS. 1, 2 and 3, discharges into a downwardly extending chute which terminates above the inner annulus 32b of the rotating table 32.

Hence, the separator 16 deposits on the table 32 in the outer periphery 32a thereof, a stream of bones which may include an occasional piece of meat. At the same time, there is deposited from the separator 16 onto the inner annulus of table 32 a stream of meat pieces, which may include an occasional bone. The purpose of the inspection table is to enable inspectors to remove the bones from the stream of meat pieces and to remove the meat from the bone pieces.

FIGS. 2–8

The conveyor 14 is best seen in FIG. 2, and includes an upwardly extending trough 50 of generally channel-shaped cross section and a generally parallel return trough 51, also of channel shaped cross section. A belt 52 runs upwardly through a conveying reach defined by the trough 50, over a drum pulley 53 which drives the belt, and downwardly through a return reach defined by trough 51. At the bottom of the return reach, the belt 52 passes around a cylindrical guide 50d, which is preferably an integral extension of the bed of the channel shaped trough 50.

The belt 52 is preferably formed of a single strand compressible plastic material. At intervals along its length, the belt 52 carries pushers 54, comprising plates, preferably also of compressible plastic material. Each plate 54 has formed centrally therein a slot consisting of a first end portion 54a of greater diameter than the belt 52, a neck portion 54b communicating with the end portion 54a, and a second end portion 54c of smaller diameter than the belt 52 and also communicating with the neck 54b. The neck 54b is narrower than either of the end portions 54a and 54c.

The plates are assembled on the belt 52 by threading the belt through the wide end portions 54a of the slots and thereafter sliding the belt laterally through the neck portion 54b, compressing the plastic material as may be necessary, and into the smaller end portion 54c, where it remains fixed in position by compression of the plastic material. After all the plates are assembled on the plastic belt, its ends may be fastened by plastic welding or by any other suitable means. The plates are so tightly held on the belt 52, and the apertures 54c are completely filled by the belt, since it is under compression in those apertures, so that it is not necessary to remove the plates from the belt and clean them every time the apparatus is shut down for cleaning. The possibility of accumulation of germ growth promoting materials between the belt 52 and the plate 54 is extremely small.

The conveyor 14 is supported on a frame member 8 of the disuniter truck by means of a bracket 55. The bracket 55 consists of a pipe section 55a fixed at its right-hand end, as it appears in FIG. 2, to a semicylindrical channel 55b adjustably held in place on the frame member 8 by means of a cooperating semicylindrical clamp 56 having slots to receive oppositely projecting pins 55c on the channel 55b, and a thumbscrew 57 for tightening the channel 55b and the clamp 56 on the frame member 8. The other end of the pipe section 55a is welded to a bar 58 extending generally parallel to the troughs 50 and 51. At its lower end, the bar 58 is welded to the central section of a U-shaped rod 59 (see FIG. 4) having an upper arm 59a which extends under the trough 50 and a lower arm 59b which extends under the trough 51. On the upper end of the bar 58, there is mounted a shaft or arm 60, which may be of nylon, force-fitted into an aperture on the end of bar 58 (see FIG. 5).

The ends of the arms 59a and 59b are provided with heads 59c and 59d which engage the sides of the troughs 50 and 51 and hold them against lateral movement. A transverse flange 50a extends downwardly from the bed of the channel shaped trough 50 adjacent the middle thereof and is adapted to rest against the upper surface of the arm 59a, as shown in FIGS. 2 and 4. The channel 51 is provided with a similar transverse flange 51a adapted to rest against the arm 59b.

The trough 50 is provided adjacent its lower end with forwardly projecting extensions 50b on its side flanges. A plate 61 of channel shaped cross section conforms to the contour of the flange extensions 50b and to the extensions 50c of those flanges along the guide 50d. The lower end of plate 61 is provided with bent over fingers 61a for engaging the ends of extensions 50c, which extend parallel to the conveying reach. The guide 50d extends tangentially from the lower end of the conveying reach of trough 50 through an arc of more than 180°, so that its free end curls back toward the conveying reach. The guise 50d must extend at least 180° and preferably more, as shown, so as to guide the conveyor belt 52 smoothly, without having the pushers 54 hang on the end of the guide. The upper end of the plate 61 is provided with bendable fingers 61b, which may be bent over to engage the top edges of the flange extensions 50b when plate 61 is in place. The lower end of the trough 51 is provided with inwardly projecting fingers 51b, which are adapted to engage and rest on the ends of the flanges 50c. When the two troughs 50 and 51 are assembled and the plate 61 is in place, as shown in FIG. 2, the guide 50d cooperates with the plate 61 and with the side flanges of the two troughs to define a direction reversing connection between the return reach and the conveying reach of the conveyor. Plate 61 also cooperates with the flange extensions 50b to define the feed hopper 15, open at the top.

Rotatably mounted on the shaft 60 at the upper end of the conveyor is the drum pulley 53 which drives the belt 52. Fixed on one end of the drum pulley 53 is a grooved pulley 62 over which runs a drive belt 63. The opposite end of the belt 63 encircles a capstan 64 on the vertical shaft 65 of the disuniter 11. That shaft is driven by a motor unit 66 (see FIG. 1).

The belt 63 encircles the capstan 64 for one and one-half turns, to minimize slippage. The capstan 64 is of increasing diameter in the upward direction, os that any slack in the belt 63 is taken up by the belt riding up to the wider part of the capstan.

The upper end of the trough 50 has a dependent finger 67 slotted on its upper side to receive the outer end of the shaft 60 (see FIG. 2). The other side of the trough 50 has another dependent finger 68, which extends laterally from the trough 50 to clear the pulley 62 (see FIG. 5). The end of the finger 68 is slotted like the finger 67 to receive the shaft 60.

The discharge chute 70 has a projecting tongue 71 at its upper end, which conforms in contour to the tongue 72 on the trough 51, so that the upper end of the chute rests on the top of the trough 51. The discharge chute 70 also has flange extensions 73, which project beyond its upper end and overlap the upper ends of the flanges on the trough 51, preferably being located inside the latter flanges. These flange extensions 73 preferably extend approximately to a point opposite the center of the drum 53, and may extend farther so as to overlap the flanges on the trough 50, depending upon the nature of the pieces being conveyed. Their function is to prevent those pieces from being accidentally discharged sidewise over the ends of the drum 53.

The lower end of the chute 70 extends into a suitable receiving aperture on the disuniter 11. The discharge chute 70 may be provided with a curve along the middle part of its length, as shown, to accommodate the difference between the angular position of the discharge end of the conveyor 14 and the angular position of the inlet into the disuniter 11.

The conveyor 14 may be disassembled and removed from the truck, by first lifting off the chute 70, which is simply resting at its upper end on the tongue 72 on the trough 51, and at a lower point on disuniter 11. The trough 51 may then be removed by sliding it upwardly, so that the flange 51c clears the arm 59b and the fingers 51b are disengaged from flange extension 50c. The plate 61 is then removed from the lower end of the conveyor The trough 50 is now moved upwardly to disengage the flange 50a from the arm 59a. The slots in the fingers 67 and 68 are deep enough to permit this movement. The trough 50 is then swung outwardly about the shaft 60 as a pivot and is then moved downwardly until the shaft 60 clears the fingers 67 and 68. The trough 50 and the belt 52 with it may now be moved laterally, sliding the belt off the end of the drum 53, away from the pulley 62. The supporting bracket 55 may now be removed by releasing its clamp 56. The release of the clamp allows movement of the drum pulley 53 inwardly sufficiently far to allow the belt 63 to be slipped off over the end of the drum pulley 53 opposite the bar 58. Drum 53 may then be removed from shaft 60. All the disassembled parts are then freely accessible for thorough cleaning.

The truck mounted disuniter apparatus 1 may be moved out of the end of the separator 2 for cleaning. In order to carry out this movement, the scraper 27 is first moved away from the drum surface by rotating the shaft 80 on which the scraper is mounted. The outer end of the shaft 80 carries a bent over finger 81, which is engageable in any of a number of notches in a retainer plate 82 fixed on the support 8. When the scraper 27 is in its operating position inside the drum, the pressure between the scraper 27 and the wall of the drum may be adjusted by moving the arm to one or the other of the notches in the retainer plate 82. The finger 81 may be sufficiently resilient to hold itself in any of the notches in plate 82 in which it is engaged.

The frame of the truck is provided with a pair of vertical guide plates 83, which move between a pair of projections 84 on the insides of the legs 22. The guide plates 83 and projections 84 ensure that the disuniter unit is properly aligned with the separator unit 2, as the truck-mounted disuniter is moved into place.

We claim:
1. Conveyor apparatus, comprising:
 a. an upwardly extending trough defining a conveying reach;
 b. an endless belt running along said conveying reach and along a return reach;
 c. a pulley for driving said belt; and
 d. a plurality of pushers attached to said belt and effective to push articles upwardly along said trough;
wherein the improvement comprises:
 e. said trough, comprising a sheet metal channel having a bed and upstanding flanges on either side of the bed; and
 f. means for demountably supporting said trough including a bracket having:
  1 a first stationary arm extending under the channel adjacent the middle thereof; and
  2. a second stationary arm extending under the channel adjacent the upper end thereof;
 g. a transverse flange extending downwardly from the bed of the channel adjacent the middle thereof and adapted to rest on said first arm; and
 h. a pair of fingers extending downwardly from the flanges adjacent the upper end thereof and having slots in their upper sides to receive the second arm;
 i. said arms, said transverse flange and said pair of fingers cooperating to provide a fixed support for said trough when said transverse flange is resting on said first arm and said second arm is received in the slots of said fingers, said trough being removable from said arms by lifting the trough sufficiently so that the transverse flange clears the first arm, and then withdrawing the trough so that the fingers move away from said second arm.

2. Conveyor apparatus as defined in claim 1, in which the pulley rotates about said second arm as an axis, and has a radius substantially equal to the distance between the bed of the trough and the slots in said fingers so that the periphery of the pulley is substantially aligned with the bed of the channel.

3. Conveyor apparatus as defined in claim 1, including a loading hopper at the bottom of said conveying reach, said loading hopper comprising:

a. forward extensions on said flanges adjacent the bottom ends thereof; and
 b. a plate engaging and overlapping said extensions, and cooperating with said channel to define a hopper open at the top.

4. Conveyor apparatus as defined in claim 3, including a stationary guide connecting said conveying reach and said return reach at their lower ends, said guide comprising:
 a. an integral portion of said channel bed extending tangentially from the lower end of the conveying reach and curved from said lower end downwardly and rearwardly in a cylindrical configuration of at least 180°;
 b. said plate having an extension on its lower end parallel to the extension on the bed of the channel; and
 c. means at the lower end of the plate extension engaging the channel and holding the plate and channel in spaced relation, said plate and channel guiding the belt and pushers from the return reach to the conveying reach.

5. Conveyor apparatus as defined in claim 1, in which said first arm has an upstanding finger at its end to hold said trough against lateral movement on the arm.

6. Apparatus as defined in claim 1, including:
 a. a second trough defining said return reach, said second trough comprising a second sheet metal channel having a bed and upstanding flanges on either side thereof;
 b. means for supporting said second channel, including:
  b 1. a third stationary arm extending under the second channel adjacent the middle thereof;
  2. a guide integral with the lower end of the first channel and curving downwardly and rearwardly therefrom through at least 180°, so that its rear end extends upwardly; and
  3. means on said second channel for engaging the upwardly extending end of said guide to hold said first and second channels in spaced relation.

7. Conveyor apparatus as defined in claim 6, in which said guide extends through a cylindrical contour of substantially more than 180°, and the end of the guide extends over the second channel and cooperates with it to guide the pushers from the second channel into the first channel.

8. Conveyor apparatus as defined in claim 1, in which:
 a. said cable comprises a single strand of deformable plastic material of substantially circular cross section; and
 b. each of said pushers comprises a plastic plate having an aperture therethrough, said aperture including:
  1. a first end portion of greater diameter than the belt;
  2. a second end portion of smaller diameter than the belt; and
  3. a connecting portion extending between said end portions and narrower than the diameter of said second end portion;
 c. said cable being movable easily through said first end portion for assembly, disassembly and cleaning of the belt and plates; said belt and plates being deformable sufficiently to allow forcible movement of the belt laterally through said connecting portion into said second end portion of the aperture; and said belt and plate being deformed sufficiently when the belt is in said second aperture to resist relative sliding movement between the pusher and the belt.

9. Conveyor apparatus, comprising:
 a. an upwardly extending trough defining a conveying reach;
 b. an endless belt running along said conveying reach and along a return reach;
 c. a pulley for driving said belt; and
 d. a plurality of pushers attached to said cable and effective to push articles upwardly along said trough;
wherein the improvement comprises:
 e. said belt, comprising a single strand of deformable material of substantially circular cross section; and
 f. said pushers, each comprising a plastic plate having an aperture therethrough, said aperture including:
  1. a first end portion of greater diameter than the belt;

2. a second end portion of smaller diameter than the belt; and
3. a connecting portion extending between said end portions and narrower than the diameter of said second end portion;

g. said cable being movable easily through said first end portion for assembly, disassembly and cleaning of the belt and plates; said belt and plates being deformable sufficiently to allow forcible movement of the belt laterally through said connecting portion into said second end portion of the aperture; and said belt and plate being deformed sufficiently when the belt is in said second aperture to resist relative sliding movement between the pusher and the belt.

* * * * *